(12) United States Patent
Tobita et al.

(10) Patent No.: US 10,225,324 B2
(45) Date of Patent: Mar. 5, 2019

(54) SYSTEM AND METHOD FOR ACTIVATION OF APPLICATION ON A DEVICE USING NEAR FIELD COMMUNICATION

(71) Applicant: FeliCa Networks, inc., Tokyo (JP)

(72) Inventors: Naoto Tobita, Tokyo (JP); Shuichi Sekiya, Saitama (JP); Tomoharu Hikita, Tokyo (JP); Kenichi Motodate, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 112 days.

(21) Appl. No.: 14/416,390

(22) PCT Filed: Jul. 5, 2013

(86) PCT No.: PCT/JP2013/068468
§ 371 (c)(1),
(2) Date: Jan. 22, 2015

(87) PCT Pub. No.: WO2014/021054
PCT Pub. Date: Feb. 6, 2014

(65) Prior Publication Data
US 2015/0207861 A1    Jul. 23, 2015

(30) Foreign Application Priority Data
Jul. 31, 2012 (JP) ................ 2012-169149

(51) Int. Cl.
*G06F 15/16* (2006.01)
*H04L 29/08* (2006.01)
(Continued)

(52) U.S. Cl.
CPC .............. *H04L 67/10* (2013.01); *G06F 9/445* (2013.01); *H04L 63/08* (2013.01); *H04L 67/34* (2013.01);
(Continued)

(58) Field of Classification Search
CPC ....................... H04B 5/0031; H04W 4/008
(Continued)

(56) References Cited

U.S. PATENT DOCUMENTS

2005/0086264 A1    4/2005  Masuda
2006/0224887 A1*  10/2006  Vesikivi ................. G06F 21/35
                                                              713/166
(Continued)

FOREIGN PATENT DOCUMENTS

JP    2005-092469 A    4/2005
JP    2005-122491 A    5/2005
(Continued)

OTHER PUBLICATIONS

Nakamichi, Tadashi, "Tokushu NFC wa "Osaifu" o Koete Dai 1 bu <Soron> Smartphone e Hyojun Tosai Susumu TV ya Shiromono Kaden nimo Nami", Nikkei Electronics, Mar. 21, 2011, p. 59, No. 1052, Nikkei BP, Tokyo, Japan.
(Continued)

*Primary Examiner* — Hieu T Hoang

(57) ABSTRACT

According to an embodiment of the present disclosure, there is provided an information processing device including an activation control unit configured to transmit first information that includes information read through near field communication to a server device, to acquire second information transmitted from the server device according to the first information, and to control activation of an application of the information processing device itself based on the acquired second information.

19 Claims, 11 Drawing Sheets

(51) Int. Cl.
*H04W 4/21* (2018.01)
*H04W 4/50* (2018.01)
*H04W 4/80* (2018.01)
*G06F 9/445* (2018.01)
*H04L 29/06* (2006.01)
*H04M 1/725* (2006.01)
*H04W 12/06* (2009.01)

(52) U.S. Cl.
CPC ........ *H04L 67/42* (2013.01); *H04M 1/72522* (2013.01); *H04W 4/21* (2018.02); *H04W 4/50* (2018.02); *H04W 4/80* (2018.02); *H04W 12/06* (2013.01)

(58) Field of Classification Search
USPC .................................................. 709/224, 225
See application file for complete search history.

(56) References Cited

U.S. PATENT DOCUMENTS

| | | | | |
|---|---|---|---|---|
| 2007/0266258 | A1* | 11/2007 | Brown | H04L 9/0822 713/183 |
| 2008/0208753 | A1* | 8/2008 | Lee | G06Q 20/045 705/51 |
| 2009/0106042 | A1* | 4/2009 | Maytal | G06Q 30/018 705/317 |
| 2009/0292927 | A1* | 11/2009 | Wenzel | G06F 21/41 713/185 |
| 2009/0303019 | A1 | 12/2009 | Trappeniers et al. | |
| 2010/0001840 | A1* | 1/2010 | Kang | H04Q 9/00 340/10.1 |
| 2010/0161434 | A1 | 6/2010 | Herwig et al. | |
| 2010/0198873 | A1* | 8/2010 | Falk | G06F 21/35 707/784 |
| 2010/0293275 | A1* | 11/2010 | Rezaiifar | H04L 47/70 709/225 |
| 2010/0320266 | A1* | 12/2010 | White | G06Q 20/20 235/375 |
| 2011/0012715 | A1* | 1/2011 | Eschenauer | G06Q 10/06 340/10.42 |
| 2011/0264543 | A1 | 10/2011 | Taveau et al. | |
| 2011/0276961 | A1* | 11/2011 | Johansson | G06F 8/61 717/178 |
| 2012/0011572 | A1 | 1/2012 | Chew et al. | |
| 2012/0029990 | A1* | 2/2012 | Fisher | G06Q 20/105 705/14.19 |
| 2012/0264401 | A1* | 10/2012 | Hwang | G06Q 20/3278 455/411 |
| 2012/0280790 | A1* | 11/2012 | Gerhardt | G07C 9/00309 340/5.61 |
| 2012/0310720 | A1* | 12/2012 | Balsan | G06Q 20/204 705/14.26 |
| 2013/0040561 | A1* | 2/2013 | Conde e Silva | H04W 4/008 455/41.1 |
| 2014/0019759 | A1* | 1/2014 | Burmester | H04L 63/08 713/172 |
| 2014/0025973 | A1* | 1/2014 | Schillings | H04Q 9/00 713/323 |

FOREIGN PATENT DOCUMENTS

| | | |
|---|---|---|
| JP | 2006-243961 A | 9/2006 |
| JP | 2009-031895 A | 2/2009 |
| JP | 2010-134932 A | 6/2010 |
| JP | 2011-523749 A | 8/2011 |

OTHER PUBLICATIONS

Intellectual Property Office of Singapore Search Report dated Oct. 16, 2015 in patent application No. 11201500524W.
International Search Report corresponding to PCT/JP2013/068468, dated Sep. 17, 2013, 2 pgs.
Tadashi Nakamichi, "Tokushu NFC wa 'Osaifu' o Koete Dai 1 Bu <Soron> Smartphone e Hyojun Tosai Susumu TV ya Shiromono Kaden nlmo Nami", Nikkei Electronics, Mar. 21, 2011 (Mar. 21, 2011), No. 1052, p. 59.
Office Action of JP Patent Application No. 2014-528053, dated Oct. 4, 2016, 06 pages of English Translation and 06 pages of Office Action.
"Mobile Wallet" NFC Beyond, Nikkei Electronics, Japan, Nikkei BP, URL: http://techon.nikkeibp.co.jp/NE, Mar. 21, 2011, 9 pages.
Office Action for JP Patent Application No. 2014-528053, dated May 30, 2017, 07 pages of Office Action and 07 pages of English Translation.
Ri Nakamichi, Special Topic: NFC Exceeds "OSAIFU (Wallet)", vol. 1 <General Statement> Advancement to Standard Installation in Smartphone, Wavy Influence on Television and White Goods, NIKKEI Electronics, Japan, Nikkei BP Corporation, Mar. 21, 2011, No. 1052, p. 59.

* cited by examiner

FIG.10

| No | ACTION EXAMPLE | COUNTERPART TAG ID | DEVICE ITSELF USER ID | SENSOR INFORMATION POSITION DATA | SENSOR INFORMATION TEMPERATURE | USER ADDED INFORMATION (USER OPERATION DETAIL) | SYSTEM SERVER INFORMATION TIME | SYSTEM SERVER INFORMATION LOG | SYSTEM SERVER INFORMATION USER PROFILE | OTHER SERVER LINKAGE INFORMATION WEATHER |
|---|---|---|---|---|---|---|---|---|---|---|
| 1 | COUPON | ○ | ○ | | | | | | | |
| 2 | COUPON (ONLY FOR LIMITED TIME) | ○ | ○ | | | | ○ | | | |
| 3 | COUPON (ONLY FOR RAINY DAY) | ○ | ○ | | | | | | | ○ |
| 4 | COUPON (ONE-PER-DAY) | ○ | ○ | | | | | ○ | | |
| 5 | COUPON (ONLY FOR LIMITED AREA) | | | ○ | | | | | | |
| 6 | COUPON (ONLY FOR HOT SUMMER DAY) | | | | ○ | | | | | |
| 7 | COUPON (ONLY FOR STUDENT) | | | | | | | | ○ | |
| 8 | COUPON (ONLY FOR DURING CAMPAIGN) | | | | | ○ (INPUT CAMPAIGN NUMBER) | | | | |
| 9 | STAMP-RALLY | ○ | ○ | ○ | | | ○ | | | |
| 10 | DISPLAY OF IMAGE OF MEMBERSHIP CARD | ○ | ○ | | | | | | | |

SYSTEM AND METHOD FOR ACTIVATION OF APPLICATION ON A DEVICE USING NEAR FIELD COMMUNICATION

CROSS-REFERENCE TO RELATED APPLICATION

The present application is a national phase entry under 35 U.S.C. § 371 of International Application No. PCT/JP2013/068468 filed Jul. 5, 2013, published on Feb. 6, 2014 as WO 2014/021054 A1, which claims priority from Japanese Patent Application No. JP 2012-169149 filed in the Japanese Patent Office on Jul. 31, 2012.

TECHNICAL FIELD

The present disclosure relates to an information processing device, a server device, and an information processing system.

BACKGROUND ART

In recent years, systems that use the technology of near field communication using cards in which IC chips (IC cards) are embedded to enable use of automatic ticket checkers at stations, payment of product prices at stores with electronic money, and the like have become widespread. The near field communication is communication that can be performed by devices when they come within about, for example, 10 centimeters from each other. In such a system, when an IC card is held over a reader-writer, use of an automatic ticket checker at a station, payment of a product price at a store using electronic money, and the like are possible. Further, systems that enable use of automatic ticket checkers, payment of product prices, and the like in the same manner by embedding such an IC chip in a mobile telephone and holding the mobile telephone over a reader-writer have also become widespread.

In addition, recently, there is a system in which an arbitrary program stored in a mobile telephone is executed by holding the device in which an IC chip is embedded near a reader-writer. For example, there is a system in which, by holding such a device in which an IC chip is embedded over a reader-writer installed in a store, a coupon that can be used at the store is provided to the device.

CITATION LIST

Patent Literature

Patent Literature 1: JP 2005-122491A

SUMMARY OF INVENTION

Technical Problem

In the past, in order to change a setting for deciding a program to be executed when a device in which an IC chip is embedded is held over a reader-writer, it was necessary to change definitions thereof on the reader-writer side. Changing of the definitions on the reader-writer side needed to be performed manually in the past, or via a network when the reader-writer was connected to the network. When the change was performed manually, a work cost required from the reader-writer side for the change of the definitions increased. In addition, when it was performed via a network, an introduction cost of the reader-writer corresponding to network connection increased.

In addition, when an application that reads an IC tag in near field communication and thereby operates according to the read result was to be developed in the past, it was necessary to install a mechanism that accesses the IC tag in each of applications. In addition, as data stored in the IC tag was optimized for each service, it was difficult to use the data in other applications. Patent Literature 1 discloses an application program execution system in which flexible construction and change are possible; however, in the system disclosed in Patent Literature 1, linkage with applications within a device is not possible.

Therefore, the present disclosure provides a novel and improved information processing device, a server device, and an information processing system that enable execution of an application according to a result of reading an IC tag in near field communication while suppressing an operation cost.

Solution to Problem

According to an embodiment of the present disclosure, there is provided an information processing device including an activation control unit configured to transmit first information that includes information read through near field communication to a server device, to acquire second information transmitted from the server device according to the first information, and to control activation of an application of the information processing device itself based on the acquired second information.

According to an embodiment of the present disclosure, there is provided a server device including an application managing unit configured to preliminarily retain information of an application to be activated in an information processing device, and an application activation instructing unit configured to acquire the information of the application to be activated in the information processing device from the application managing unit according to information that includes information read by the information processing device through near field communication and that has been transmitted from the information processing device and to reply to the information processing device.

According to an embodiment of the present disclosure, there is provided an information processing system including an information processing device, and a server device. The information processing device includes an activation control unit configured to transmit first information that includes information read through near field communication to the server device, to acquire second information transmitted from the server device according to the first information, and to control activation of an application of the information processing device based on the acquired second information. The server device includes an application managing unit configured to preliminarily retain information of an application to be activated in the information processing device, and an application activation instructing unit configured to acquire the information of the application to be activated in the information processing device from the application managing unit according to the first information transmitted from the information processing device and to reply to the information processing device.

Advantageous Effects of Invention

According to the present disclosure described above, it is possible to provide a novel and improved information processing device, a server device, and an information processing system that enable execution of an application according to a result of reading an IC tag in near field communication while suppressing an operation cost.

BRIEF DESCRIPTION OF DRAWINGS

FIG. 10 is an explanatory diagram showing services to be provided to the terminal device 100 in the information processing system 1.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the following order.

<1. An embodiment of the present disclosure>
 [Configuration example of an information processing system]
 [Functional configuration example of a system server]
 [Functional configuration example of a terminal device]
 [Operation example of an information processing system]
<2. Conclusion>

<1. An Embodiment of the Present Disclosure>

Figure 1:
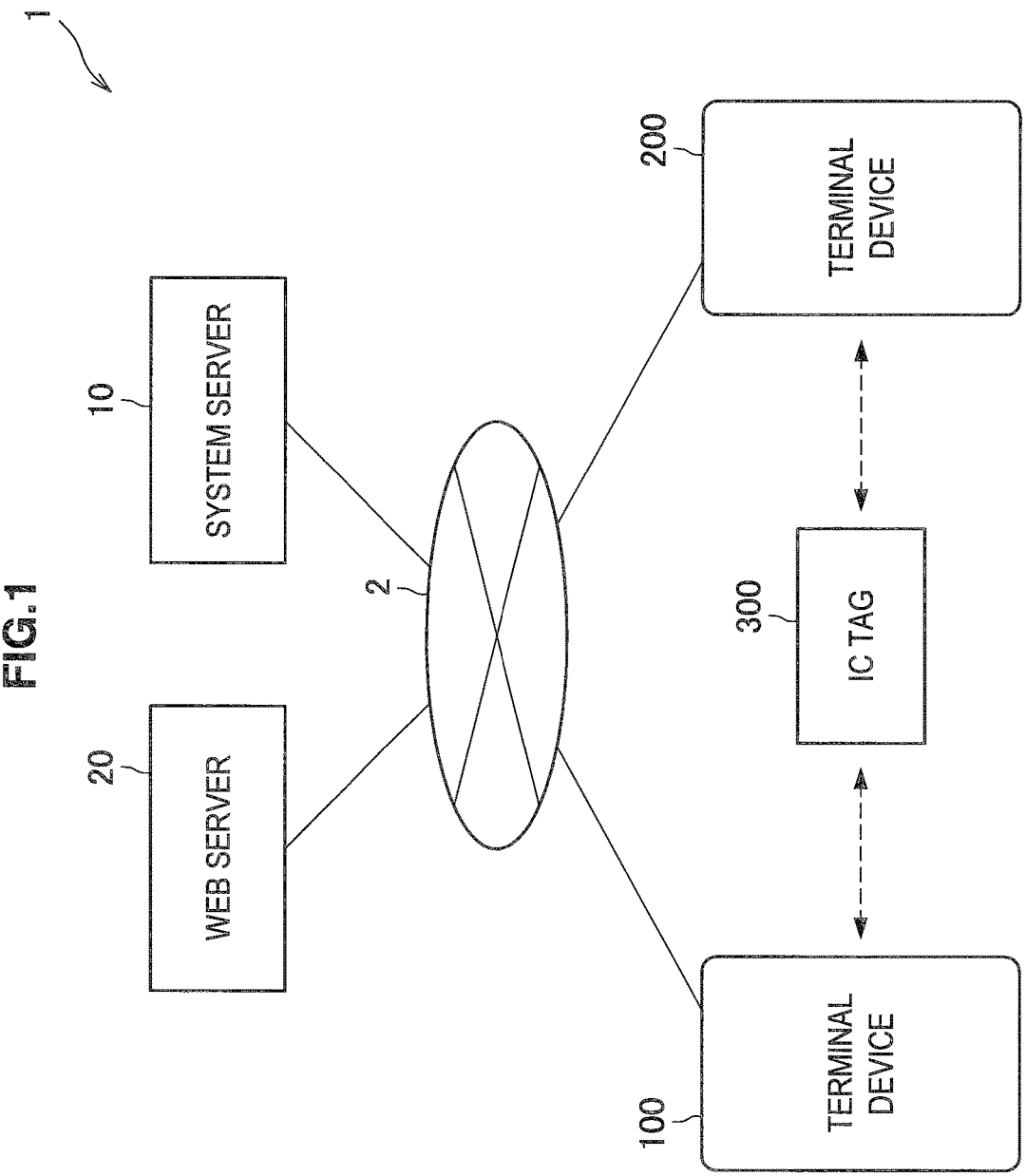
FIG. 1 is an illustrative diagram showing a configuration example of an information processing system 1 according to an embodiment of the present disclosure.

First, a configuration example of an information processing system according to an embodiment of the present disclosure will be described with reference to an accompanying drawing. FIG. 1 is an illustrative diagram showing the configuration example of the information processing system 1 according to the embodiment of the present disclosure. Hereinbelow, the configuration example of the information processing system 1 according to the embodiment of the present disclosure will be described using FIG. 1.

As shown in FIG. 1, the information processing system 1 according to the embodiment of the present disclosure is configured to include a system server 10, a web server 20, terminal devices 100 and 200, and an IC tag 300.

The system server 10 is a server device that manages information used in the information processing system 1 according to the embodiment of the present disclosure to control operations of the terminal device 100 through near field communication (NFC). As will be described later with respect to a specific configuration and operation of the system server 10, the system server 10 replies to the terminal device 200 with information of an application executed in the terminal device 200 based on information transmitted from the terminal device 200 through a network 2. Here, the information transmitted from the terminal device 200 through the network 2 includes information that the terminal device 200 acquires from the IC tag 300 in the near field communication.

The web server 20 is a server that provides a website according to a request from a client terminal. The web server 20 causes a website to be displayed in a browser application executed in the terminal device 100, for example, upon access of the terminal device 100 thereto.

The terminal devices 100 and 200 are devices that can execute near field communication with the IC tag 300 and then read information recorded on the IC tag 300. Thus, the terminal devices 100 and 200 each have a reader-writer for reading such information recorded on the IC tag 300 therein. The near field communication performed between the terminal devices 100 and 200 and the IC tag 300 is communication performed at a frequency of, for example, 13.56 MHz.

The terminal device 100 is a device that executes an application according to information acquired from the IC tag 300 in the near field communication. As will be described later with respect to a specific configuration and operation of the terminal device 100, the terminal device 100 is held over the IC tag 300, executes the near field communication with IC tag 300, and thereby can execute an application according to the IC tag 300 over which the terminal device 100 has been held.

In addition, the terminal device 200 is a device that registers a function that the IC tag 300 provides in the system server 10 and changes a function that has also been registered in the system server 10. As will be described later with respect to a specific configuration and operation of the terminal device 200, the terminal device 200 is held over the IC tag 300, then executes the near field communication with the IC tag 300, and thereby can register and change functions that the IC tag 300 provides in the system server 10.

As applications that the terminal device 100 executes according to information acquired from the IC tag 300 in the near field communication, for example, there are a browser application, a map application, a mail application, an SNS application, a game application, an electronic book application, and the like. When the terminal device 100 is held over the IC tag 300, for example, activating a browser application is designated from the system server 10, and access to a website that the web server 20 provides is designated.

The terminal devices 100 and 200 can adopt various forms as long as the devices can execute near field communication with the IC tag 300. For example, the terminal device 100 may be a smartphone, a tablet-type mobile terminal, a reader-writer terminal, any of various electric appliances with a reader-writer, or the like. In addition, the terminal device 200 may be a smartphone, a tablet-type mobile terminal, a reader-writer terminal, a personal computer with a reader-writer, or the like.

The IC tag 300 is a tag that operates by receiving radio waves from the terminal device 100 or 200 when the terminal device 100 or 200 is held over the tag. The IC tag 300 provides information to the terminal device 100 or 200 through the near field communication when the terminal device 100 or 200 is held over the tag. For the IC tag 300, various ones can be used regardless of a form and presence of a security function as long as they can perform near field communication with the terminal devices 100 and 200. Note that the IC tag 300 is assumed to store a tag ID for unique identification.

The IC tag 300 is provided in various forms. For example, the IC tag 300 may be affixed to posters distributed in stores and streets. When a user of the terminal device 100 holds the terminal device 100 over the IC tag 300 affixed to a poster, he or she can receive various services from a service provider that supervises the IC tag 300. In the present embodiment, when the user of the terminal device 100 holds the terminal device 100 over the IC tag 300 affixed to a poster, the terminal device 100 can execute an application corresponding to the IC tag 300.

As the information processing system 1 according to the embodiment of the present disclosure has the configuration shown in FIG. 1, when the terminal device 100 is held over the IC tag 300, an application to be executed by the terminal device 100 can be designated from the system server 10. In addition, since the system server 10 manages setting of the application to be executed in the terminal device 100 when the terminal device 100 is held over the IC tag 300, the information processing system 1 according to the embodiment of the present disclosure enables execution of the application according to a result of reading the IC tag 300 through the near field communication while suppressing an operation cost of the system.

So far, the configuration example of the information processing system 1 according to the embodiment of the present disclosure has been described using FIG. 1. Next, a functional configuration example of the system server 10 according to the embodiment of the present disclosure will be described.

[Functional Configuration Example of a System Server]

Figure 2:
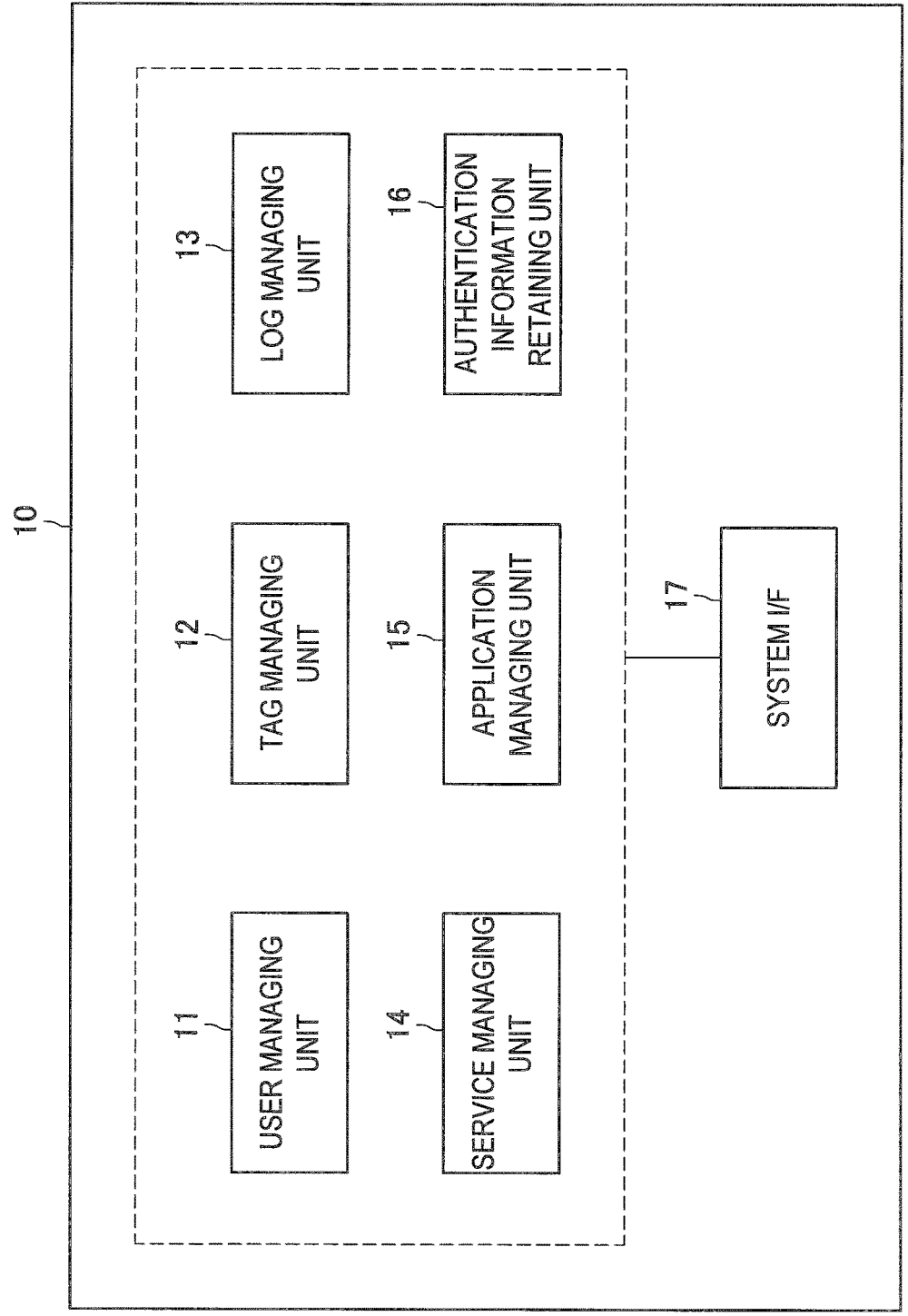
FIG. 2 is an illustrative diagram showing a functional configuration example of a system server 10 according to an embodiment of the present disclosure.

FIG. 2 is an illustrative diagram showing the functional configuration example of the system server 10 according to the embodiment of the present disclosure. Hereinbelow, the functional configuration example of the system server 10 according to the embodiment of the present disclosure will be described using FIG. 2.

As shown in FIG. 2, the system server 10 according to the embodiment of the present disclosure is configured to include a user managing unit 11, a tag managing unit 12, a log managing unit 13, a service managing unit 14, an application managing unit 15, an authentication information retaining unit 16, and a system I/F 17.

The user managing unit 11 manages information of a user who uses the information processing system 1 according to the embodiment of the present disclosure. The information of the user that the user managing unit 11 manages may include, for example, a user ID for uniquely identifying the user, and may also include a terminal ID for uniquely managing the terminal device 100. The information of the user that the user managing unit 11 manages is used for services that the system server 10 provides, and used for other cases, for example, for instructing the terminal device 100 as described later. to activate an application The tag managing unit 12 manages information of the IC tag 300 that is used in the information processing system 1 according to the embodiment of the present disclosure. The information of the IC tag 300 that the tag managing unit 12 manages may be, for example, a tag ID for uniquely identifying the IC tag 300, a service ID for identifying a service associated with the tag ID for uniquely identifying the IC tag 300, a location ID for identifying a location, a store, or the like, and a store ID. Note that there may be a plurality of service IDs associated with one tag ID.

The log managing unit 13 manages various logs in the information processing system 1 according to the embodiment of the present disclosure. Information of logs that the log managing unit 13 manages is, for example, a user ID or a terminal ID of the terminal device 100 that is held over the IC tag 300, a tag ID of the IC tag 300 over which the device is held, a date and time of holding, additional information transmitted from the terminal device 100 when it is held over the IC tag 300, and the like.

The service managing unit 14 manages information of services provided in the information processing system 1 according to the embodiment of the present disclosure. The information of services that the service managing unit 14 manages is, for example, categories of the services to be described later, a service ID for uniquely identifying a service, the name of a service, and the like. The service ID that the service managing unit 14 manages is associated with a tag ID that the tag managing unit 12 manages.

The application managing unit 15 manages information of applications executed in the terminal device 100 when the terminal device 100 is held over the IC tag 300. The information of applications that the application managing unit 15 manages is, for example, a service ID of each service that the IC tag 300 provides, an application ID for uniquely identifying each application executed in the terminal device 100, an activation parameter designated at the time of activating the application, and the like.

The authentication information retaining unit 16 retains authentication information for authenticating legitimacy of the IC tag 300 when the terminal device 100 is held over the IC tag 300. The authentication information that the authentication information retaining unit 16 retains is, for example, a session random number to be provided to the terminal device 100, a master key for authenticating information that the IC tag 300 retains and a session random number, and the like.

The system I/F 17 is an interface for using information that each element of the system server 10 described above manages from another device, and for providing the information that each element of the system server 10 described above manages to another device. When the terminal device 100 is held over the IC tag 300 and information from the terminal device 100 is transmitted to the system server 10, the information from the terminal device 100 is provided to each element of the system server 10 described above through the system I/F 17. In addition, when information that the system server 10 manages is transmitted to the terminal device 100, the information is transmitted to the terminal device 100 from the system I/F 17. Thus, the system I/F 17 is an example of an application activation instructing unit of the present disclosure. Furthermore, the system server 10 may exchange information with the web server 20 through the system I/F 17. As the system I/F 17, for example, an application program interface (API) that provides information may be used.

As the system server 10 according to the embodiment of the present disclosure has the configuration shown in FIG. 2, the system server 10 can manage setting of an application to be executed in the terminal device 100 when the terminal device 100 is held over the IC tag 300. Thus, the system server 10 according to the embodiment of the present disclosure can enable execution of the application in the terminal device 100 according to a result of reading the IC tag through the near field communication while suppressing an operation cost of the information processing system 1.

So far, the functional configuration example of the system server 10 according to the embodiment of the present disclosure has been described using FIG. 2. Next, a functional configuration example of the terminal device 100 according to the embodiment of the present disclosure will be described.

[Functional Configuration Example of a Terminal Device]

Figure 3:
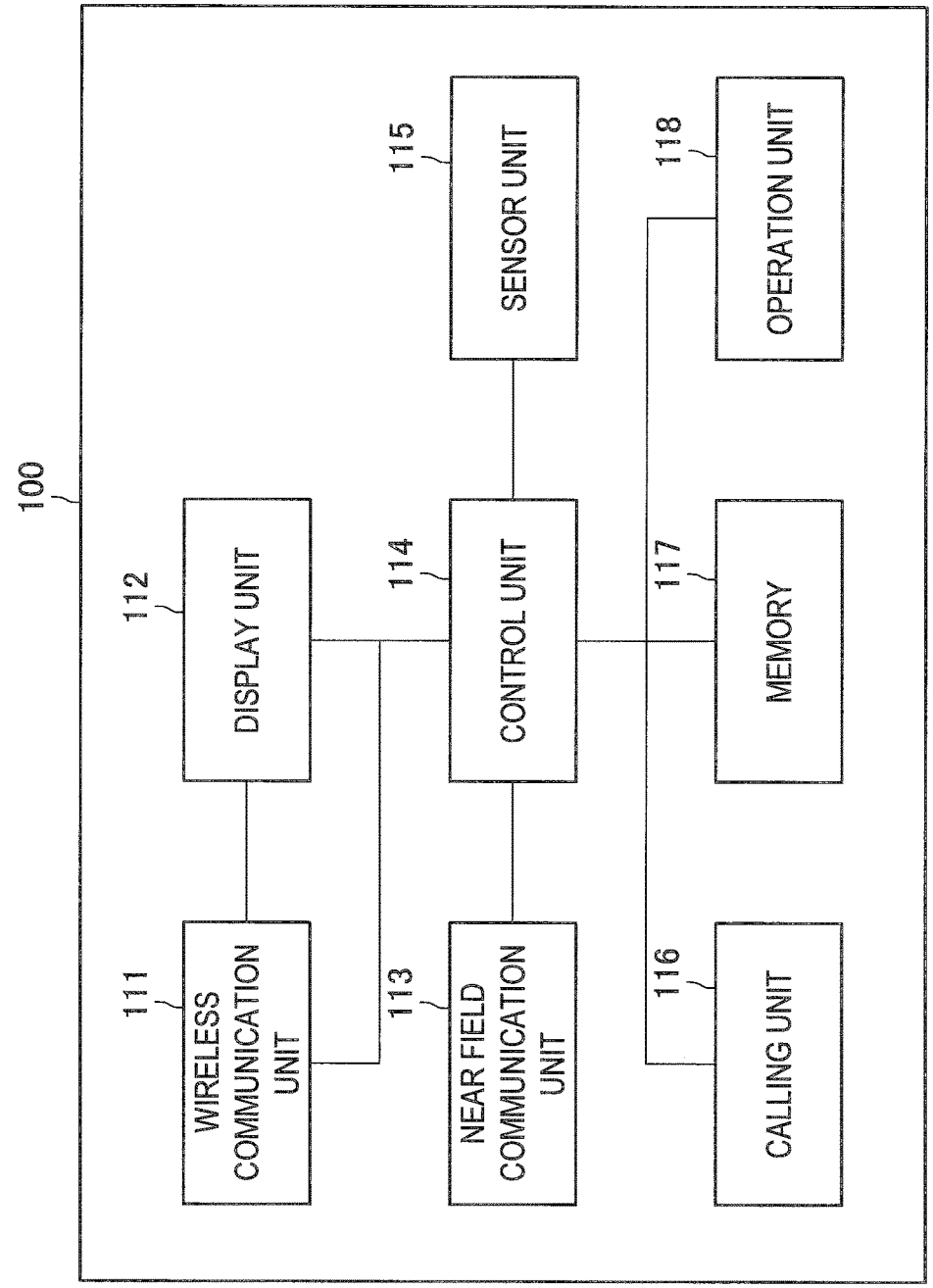
FIG. 3 is an illustrative diagram showing a functional configuration example of a terminal device 100 according to an embodiment of the present disclosure.

FIG. 3 is an illustrative diagram showing the functional configuration example of the terminal device 100 according to the embodiment of the present disclosure. Hereinbelow, the functional configuration example of the terminal device 100 according to the embodiment of the present disclosure will be described using FIG. 3.

As shown in FIG. 3, the terminal device 100 according to the embodiment of the present disclosure is configured to include a wireless communication unit 111, a display unit 112, a near field communication unit 113, a control unit 114, a sensor unit 115, a calling unit 116, a memory 117, and an operation unit 118.

The wireless communication unit 111 performs wireless communication with another device (for example, the system server 10 or the web server 20) through a wireless network. The display unit 112 displays information that the wireless communication unit 111 receives, and information according to an operation performed by a user with respect to the operation unit 118. The display unit 112 is configured by, for example, a flat-type image display panel such as a liquid crystal display or an organic EL display. In addition, in the terminal device 100 according to the embodiment of the present disclosure, a touch panel may be provided for the display unit 112.

The near field communication unit 113 performs transmission and reception of information with the IC tag 300 by executing near field communication with the IC tag 300. The near field communication unit 113 is configured as, for example, a reader-writer, and performs transmission and reception of information with the IC tag 300 by emitting predetermined radio waves to cause the IC tag 300 to generate electromotive force. The control unit 114 controls operations of the terminal device 100. For example, the control unit 114 executes a program stored in the memory 117, and thereby controls an operation of the terminal device 100. As control of operations of the terminal device 100 by the control unit 114, for example, there is execution of a basic application for activating an application according to the IC tag 300 through communication of the near field communication unit 113 with the IC tag 300. Therefore, the control unit 114 is an example of an activation control unit of the present disclosure.

The sensor unit 115 includes sensors that sense various kinds of information. As the sensors constituting the sensor unit 115, for example, there may be a position sensor that acquires a current position, a temperature sensor that acquires a current temperature, and the like. As the sensor unit 115 senses various kinds of information, the control unit 114 can use the information that the sensor unit 115 has sensed as additional information obtained when the terminal device 100 is held over the IC tag 300.

The calling unit 116 is constituted by, for example, a speaker and a microphone, and executes a call based on voices with another mobile telephone or a fixed telephone. The memory 117 is constituted by, for example, a read only memory (ROM), a random access memory (RAM), and the like, and is used to store programs for controlling operations of the terminal device 100. The operation unit 118 is constituted by buttons for operating the terminal device 100. According to operations of the operation unit 118, the control unit 114 controls operations of the terminal device 100. Note that, when a touch panel is provided in the display unit 112, the touch panel also functions as the operation unit 118.

Note that, although FIG. 3 shows the configuration of the terminal device 100 in which the calling unit 116 is included, the present disclosure is not limited to this example. In other words, when the calling function is not necessary for the terminal device 100, the configuration of the terminal device 100 may exclude the calling unit 116.

So far, the functional configuration example of the terminal device 100 according to the embodiment of the present disclosure has been described using FIG. 3. By having the configuration shown in FIG. 3, the terminal device 100 according to the embodiment of the present disclosure can execute near field communication with the IC tag 300, and thereby can transmit information acquired from the IC tag 300 to the system server 10. In addition, the terminal device 100 according to the embodiment of the present disclosure can control activation of an application based on information with which the system server 10 has replied. Note that FIG. 3 shows the functional configuration example of the terminal device 100 according to the embodiment of the present disclosure; however, the terminal device 200 is assumed to also have the configuration shown in FIG. 3.

Next, an operation example of the information processing system 1 according to the embodiment of the present disclosure will be described.

[Operation Example of an Information Processing System]

Figure 4:
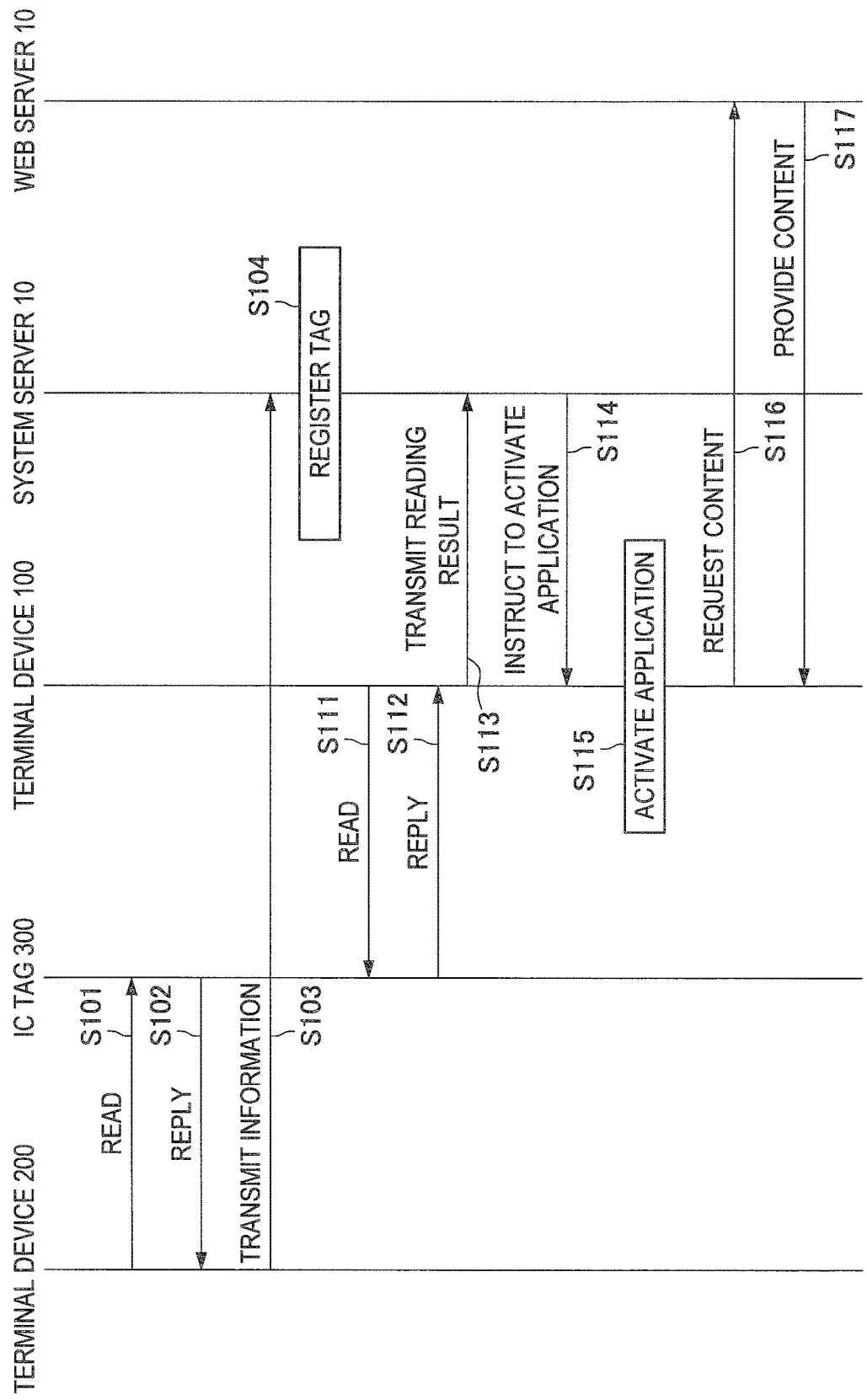
FIG. 4 is a flowchart showing an operation example of the information processing system 1 according to an embodiment of the present disclosure.

FIG. 4 is a flowchart showing an operation example of the information processing system 1 according to the embodiment of the present disclosure. Hereinbelow, the operation example of the information processing system 1 according to the embodiment of the present disclosure will be described using FIG. 4.

First, a method of registering the tag ID of the IC tag 300 in the system server 10 will be described. There are a variety of methods as methods of registering the tag ID of the IC tag 300 in the system server 10. For example, there is a method of registering the tag ID and information of a service colligated with the tag ID in the system server 10 through manual input from a user using a terminal device for management (for example, the terminal device 200). However, when the system server 10 collectively manages information of the IC tag 300 as in the present embodiment, the tag ID of the IC tag 300 and the service colligated with the IC tag 300 can be registered in the system server 10 using the terminal device for management (for example, the terminal device 200) without depending on manual input from a user.

In order to register the tag ID of the IC tag 300 in the system server 10, the terminal device 200 for management is held over the IC tag 300 and then reads the tag ID recorded in the IC tag 300 (Step S101). Through near field communication between the terminal device 200 and the IC tag 300, the IC tag 300 replies to the terminal device 200 with the tag ID (Step S102).

The terminal device 200 that has acquired the tag ID from the IC tag 300 transmits the acquired tag ID, information of a pre-designated service that is desired to be associated with the IC tag 300 (for example, a service ID), and information of a terminal ID of the terminal device 200 and/or a user ID under which the terminal device 200 is operated to the system server 10 (Step S103). Note that the user ID of the user who operates the terminal device 200 is assumed to be registered in the terminal device 200 or to be input by the user in advance using an arbitrary method.

Then, the system server 10 executes registration of the tag ID of the IC tag 300 using the information transmitted from the terminal device 200 (Step S104). When the tag ID of the IC tag 300 is registered, the system server 10 may determine whether or not the terminal ID of the terminal device 200 and/or the user ID under which the terminal device 200 is operated have authority over the registration of the tag ID.

As described above, by designating information of the service that is desired to be associated with the IC tag 300 in advance with the terminal device 200 and holding the terminal device 200 over the IC tag 300, the tag ID of the IC tag 300 and the service that is desired to be associated with the IC tag 300 can be registered in the system server 10.

Next, an operation example when the terminal device 100 is held over the IC tag 300 will be described. As described above, when the terminal device 100 is held over the IC tag 300 and information including the tag ID of the IC tag 300 is transmitted from the terminal device 100 to the system server 10 in the information processing system 1 according to the embodiment of the present disclosure, the system server 10 replies to the terminal device 100 with information of an application to be activated. The terminal device 100 that has received the reply from the system server 10 activates an application based on the information of the application transmitted from the system server 10.

Note that, as will be described later, the user of the terminal device 100 activates the application in the terminal device 100 in advance prior to the near field communication with the IC tag 300 in the present embodiment. Then, the application being executed in the terminal device 100 is assumed to activate another application based on information from the system server 10. This application that is activated in the terminal device 100 in advance prior to the near field communication with the IC tag 300 is also referred to as a basic application. Note that the basic application of the terminal device 100 may not necessarily be activated prior to the near field communication with the IC tag 300. The terminal device 100 may be set such that the basic application is activated in the terminal device 100 using the near field communication with the IC tag 300 as a trigger.

The terminal device 100 reads the tag ID recorded in the IC tag 300 when held over the IC tag 300 (Step S111). Through the near field communication between the terminal device 100 and the IC tag 300, the IC tag 300 replies to the terminal device 100 with the tag ID (Step S112).

The terminal device 100 that has acquired the tag ID from the IC tag 300 transmits the acquired tag ID, information of a terminal ID of the terminal device 100 and/or a user ID under which the terminal device 100 is operated, and information of a service desired to be used to the system server 10 (Step S113). Note that the user ID of the user who operates the terminal device 100 is assumed to be registered in the terminal device 100 or to be input by the user in advance using an arbitrary method. The information of the service desired to be used is information of attributes of the service to be described later, and is designated by the user in the basic application as will be described later. As examples of the attributes of the service in the present embodiment, there are a "membership card," a "coupon," and the like.

In addition, when the terminal device 100 transmits the information to the system server 10 in Step S113 described above, the terminal device 100 may further transmit information of the date and time on which the device was held over the IC tag 300, and information detected by the sensor unit 115 to the system server 10. The information detected by the sensor unit 115 transmitted from the terminal device 100 to the system server 10 may include, for example, position information of the terminal device 100, temperature information of the periphery of the terminal device 100, and the like. Note that information of a current position may be recorded on the IC tag 300. The terminal device 100 may transmit the information of the current position read from the IC tag 300 to the system server 10.

The system server 10 acquires information of an application to be activated in the terminal device 100 from information that the system server 10 manages using the information transmitted from the terminal device 100. Then, the system server 10 replies to the terminal device 100 with an application activation instruction (Step S114). The application activation instruction with which the system server 10 replies to the terminal device 100 includes the application ID of the application to be activated. The application activation instruction with which the system server 10 replies to the terminal device 100 may also include an activation parameter to be used in activation, in addition to the application ID. If the application to be activated is a browser application, the activation parameter to be used in activation is, for example, an address to be connected during activation of the browser application.

When the application activation instruction is received from the system server 10, the terminal device 100 activates the application based on the received activation instruction using the basic application (Step S115). If the application ID of the browser application is designated in the application activation instruction, for example, the basic application executed in the terminal device 100 activates the browser application that corresponds to the application ID. In addition, if an address to be connected during activation of the browser application is designated in the application activation instruction as an activation parameter, the basic application designates the address to be connected and then activates the browser application.

In description provided below, the application ID of an application is assumed to be designated and further the address of the web server 20 is assumed to be designated as an activation parameter in the application activation instruction transmitted from the system server 10.

The terminal device 100 that has activated the application in Step S115 described above accesses the web server 20 designated by the activation parameter through the browser application and requests desired content (Step S116). The web server 20 provides the content to the terminal device 100 in response to the request of the content from the terminal device 100 (Step S117).

Note that, when providing the content to the terminal device 100, the web server 20 may access the system server 10 and acquire information necessary for providing the content from the system server 10 upon necessity. For example, when the web server 20 provides a coupon of which details of a service change according to the number of visits to a store, the web server may access the system server 10 to acquire the number of visits and then acquire information of the number of times that the terminal device 100 was held over the IC tag 300 installed in the store.

The "content" mentioned herein refers to various kinds of information provided in a service to use, and when a "coupon" is designated in the basic application as a service to use, for example, the coupon according to the IC tag 300 over which the device was held corresponds to the content. In addition, when a "membership card" is designated in the basic application as a service to use, for example, the membership card according to the IC tag 300 over which the device was held corresponds to the content.

So far, the operation example of the information processing system 1 according to the embodiment of the present disclosure has been described using FIG. 4. Operating as shown in FIG. 4, the information processing system 1 according to the embodiment of the present disclosure enables execution of the application in the terminal device 100 according to the result of reading the IC tag 300 through the near field communication while suppressing an operation cost.

Next, an example of graphical user interfaces (GUIs) of applications executed in the terminal device 100 according to the embodiment of the present disclosure will be described.

FIGS. 5 to 9 are illustrative diagrams showing examples of GUIs of applications executed in the terminal device 100 according to the embodiment of the present disclosure. Hereinbelow, the examples of the GUIs of applications executed in the terminal device 100 according to the embodiment of the present disclosure will be described using FIGS. 5 to 9. Note that, hereinbelow, a case in which the IC tag 300 is installed in a store in Fukushima prefecture and a user of the terminal device 100 acquires a coupon that he or she can use in the store by holding the terminal device 100 over the IC tag 300 will be described.

Figure 5:
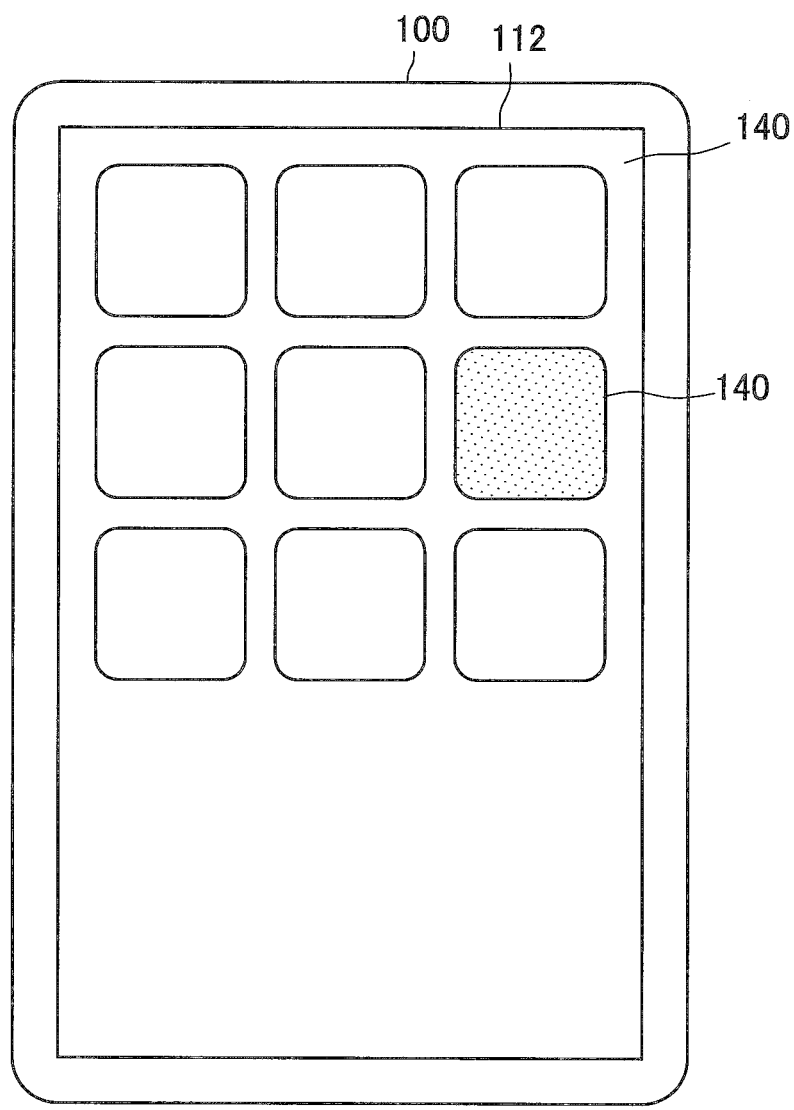
FIG. 5 is an illustrative diagram showing examples of GUIs of applications to be executed in the terminal device 100.

FIG. 5 is an illustrative diagram showing a state in which icons of applications are displayed on the display unit 112 of the terminal device 100 according to the embodiment of the present disclosure. FIG. 5 shows the state in which the nine icons are displayed on the display unit 112, and an icon 140 among the nine icons is the icon of the basic application. The user of the terminal device 100 can cause the basic application to be executed in the terminal device 100 by selecting the icon 140.

Figure 6:
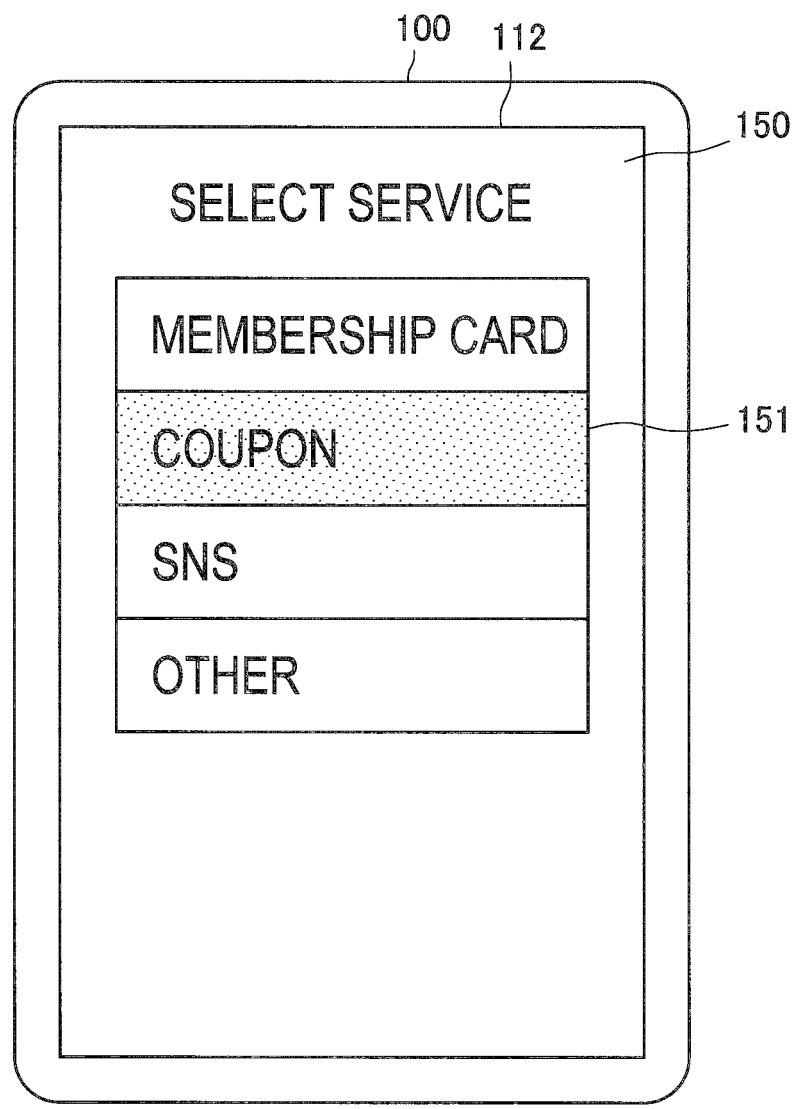
FIG. 6 is an illustrative diagram showing examples of GUIs of applications to be executed in the terminal device 100.

FIG. 6 is an illustrative diagram showing a state in which a GUI of the basic application is displayed on the display unit 112 of the terminal device 100 according to the embodiment of the present disclosure. The GUI of the basic application shown in FIG. 6 is displayed, for example, immediately after the activation of the basic application, and is a GUI of a service selection screen 150 for allowing the user to select a service. Before holding the terminal device 100 over the IC tag 300, the user of the terminal device 100 selects a service that he or she desires to use through the screen shown in FIG. 6. Note that FIG. 6 shows the state in which a region 151 for selecting the service of "coupon" has been selected by the user of the terminal device 100. In the present embodiment, although the user of the terminal device 100 selects the service that he or she desires to use before holding the terminal device 100 over the IC tag 300 as described above, the present disclosure is not limited thereto. The user of the terminal device 100 may select the service that he or she desires to use after holding the terminal device 100 over the IC tag 300. When the user of the terminal device 100 is caused to select the service that he or she desires to use after holding the device over the IC tag 300, the terminal device 100 may cause only a service that can be used with the IC tag 300 to be displayed on the display unit 112. When only the service that can be used with the IC tag 300 is displayed on the display unit 112, the terminal device 100 may acquire content of the service that can be used with the IC tag 300 from information transmitted from the system server 10.

Figure 7:
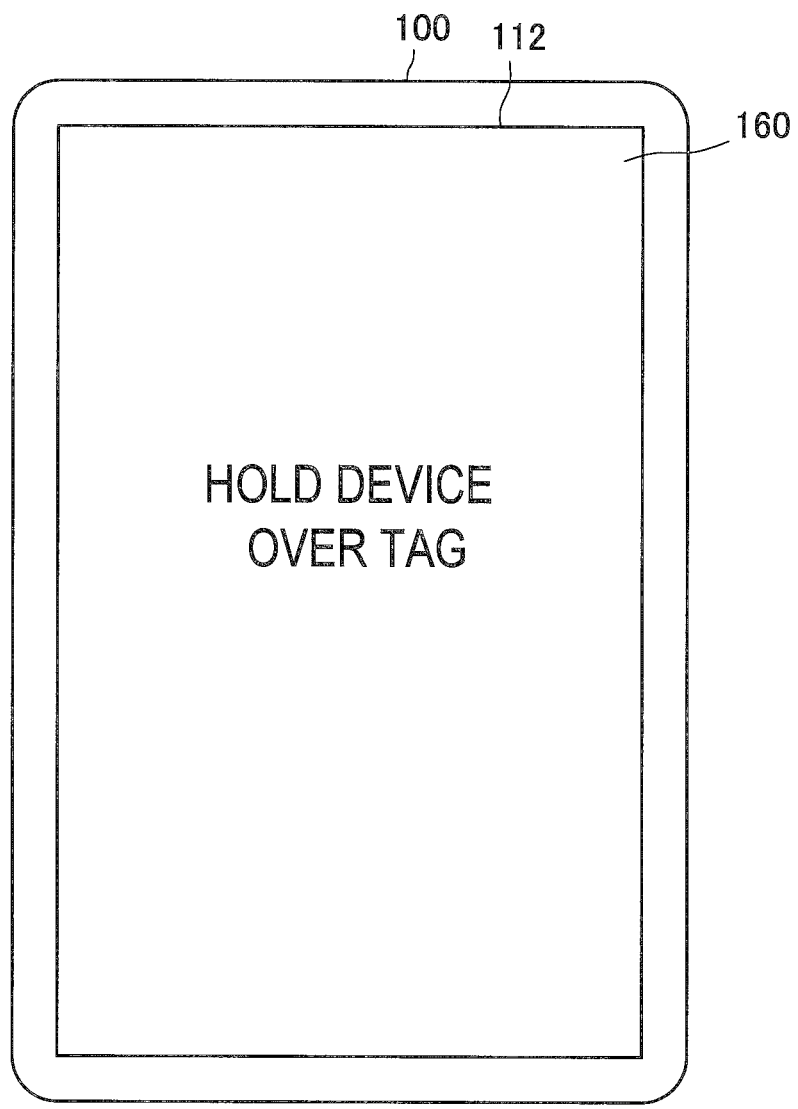
FIG. 7 is an illustrative diagram showing examples of GUIs of applications to be executed in the terminal device 100.

FIG. 7 is an illustrative diagram showing a state in which a GUI of the basic application is displayed on the display unit 112 of the terminal device 100 according to the embodiment of the present disclosure. The GUI of the basic application shown in FIG. 7 is a GUI of an instruction screen 160 that instructs the user of the terminal device 100 to hold the terminal device 100 over the IC tag 300. By displaying the instruction screen 160 shown in FIG. 7 on the display unit 112, the basic application executed in the terminal device 100 can instruct the user of the terminal device 100 to hold the terminal device 100 over the IC tag 300.

When the user of the terminal device 100 holds the terminal device 100 over the IC tag 300 in the state in which the screen shown in FIG. 7 is displayed on the display unit 112 of the terminal device 100, the near field communication shown in Step S111 and Step S112 of FIG. 4 is performed between the terminal device 100 and the IC tag 300.

Figure 8:
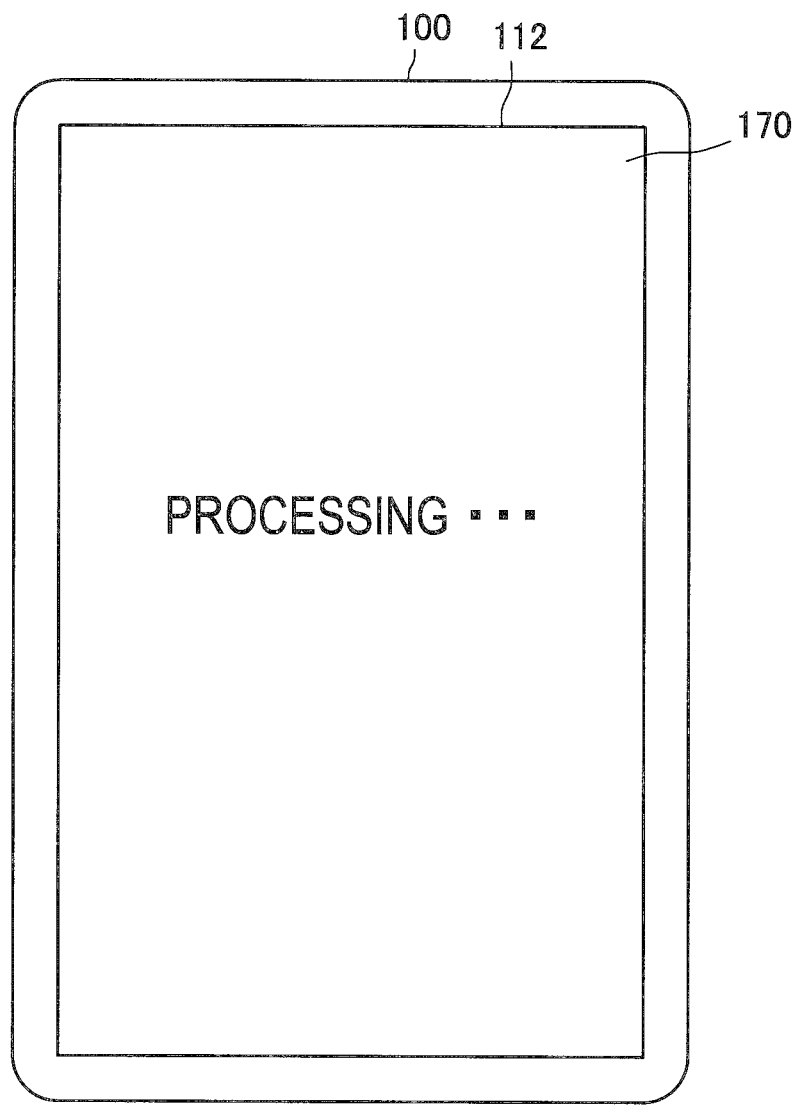
FIG. 8 is an illustrative diagram showing examples of GUIs of applications to be executed in the terminal device 100.

FIG. 8 is an illustrative diagram showing a state in which a GUI of an application of which activation is instructed by the system server 10 in Step S114 of FIG. 4 is displayed on the display unit 112 of the terminal device 100 according to the embodiment of the present disclosure. The GUI shown in FIG. 8 is a GUI of a screen during activation 170 that the application instructed to activate by the system server 10 displays on the display unit 112. As described above, the application instructed to activate by the system server 10 is activated by the basic application. Here, the application instructed to activate by the system server 10 is a browser application, and a case in which a coupon is acquired by accessing the web server 20 designated by the system server 10 is shown.

Figure 9:
FIG. 9 is an illustrative diagram showing examples of GUIs of applications to be executed in the terminal device 100.

FIG. 9 is an illustrative diagram showing a state in which a GUI of the browser application instructed to activate is displayed on the display unit 112 of the terminal device 100 according to the embodiment of the present disclosure. The GUI shown in FIG. 9 is a GUI of a coupon screen 180 displayed on the display unit 112 when the browser application accesses the web server 20. The coupon shown on the coupon screen 180 of FIG. 9 is an example of the coupon distributed to customers whose number of visits to the store of Fukushima prefecture is five or more. By presenting the coupon screen 180 displayed on the display unit 112 to the store, the user of the terminal device 100 can receive a service of one bottle of free juice.

So far, the examples of the GUIs of the applications executed in the terminal device 100 according to the embodiment of the present disclosure have been described with reference to FIGS. 5 to 9. Next, examples of services to be provided to the terminal device 100 in the information processing system 1 according to the embodiment of the present disclosure will be described.

In the information processing system 1 according to the embodiment of the present disclosure, the system server 10 can designate an application to be activated in the terminal device 100 according to a tag ID of the IC tag 300 over which the terminal device 100 is held. In the information processing system 1 according to the embodiment of the present disclosure, different services can be provided to the terminal device 100 according to a situation of a holding time even when the terminal device 100 is held over the same IC tag 300.

In the information processing system 1 according to the embodiment of the present disclosure, when coupons are to be provided to the terminal device 100, for example, different coupons can be provided according to a situation of a time at which the terminal device 100 is held over the IC tag 300.

FIG. 10 is an explanatory diagram showing services to be provided to the terminal device 100 in the information processing system 1 according to the embodiment of the present disclosure. The table shown in FIG. 10 shows that content of services to be provided to the terminal device 100 in the information processing system 1 according to the embodiment of the present disclosure change according to a tag ID of the IC tag 300, a user ID of the user who uses the terminal device 100, sensor information that can be acquired by the sensor unit 115 of the terminal device 100, user added information added by the user who uses the terminal device 100 when the terminal device 100 is held over the IC tag 300, information of the system server 10 when information is transmitted from the terminal device 100 to the system server 10, and linkage information with respect to another server that is in linkage with the system server 10 when information is transmitted from the terminal device 100 to the system server 10.

When the user of the terminal device 100 selects a "coupon" in the category of services to use and holds the terminal device 100 over the IC tag 300, the system server 10 instructs the terminal device 100 to activate an application so as to acquire the coupon. Here, when a coupon only for a limited time is to be provided to the terminal device 100, the system server 10 determines whether or not the time at which the terminal device 100 is held over the IC tag 300 is included in a target time slot of the coupon only for the limited time. In addition, when a coupon only for specific weather is to be provided to the terminal device 100, the system server 10 determines whether or not the weather of the time in which the terminal device 100 was held over the IC tag 300 coincides with the specific weather. The determination of whether or not the weather coincides with the specific weather may be performed by causing the system server 10 to link to, for example, another server that provides weather information.

In addition, when a one-per-day coupon is to be provided to the terminal device 100, the system server 10 checks a log when the terminal device 100 is held over the IC tag 300, and then determines whether or not a coupon has already been provided to the terminal device 100 that day. In addition, when a coupon only for a limited area is to be provided to the terminal device 100, the system server 10 determines whether or not the current position that the sensor unit 115 acquired when the terminal device 100 was held over the IC tag 300 is included in a target area. Furthermore, when a coupon only for a limited temperature (for example, only for a hot summer day of 30 degrees Celsius or higher) is to be provided to the terminal device 100, the system server 10 determines whether or not the temperature that the sensor unit 115 acquired when the terminal device 100 was held over the IC tag 300 corresponds to the target temperature.

In addition, when a coupon only for a predetermined user demographic (for example, only for student) is to be provided to the terminal device 100, the system server 10 checks a profile of the user when the terminal device 100 is held over the IC tag 300, and determines whether or not the user of the terminal device 100 is included in the target classification. In addition, when a coupon only for during a predetermined campaign is to be provided to the terminal device 100, the system server 10 checks that a campaign number has been input to the terminal device 100 and transmitted to the system server 10 when the terminal device 100 was held over the IC tag 300, and then determines whether or not the campaign number is for the predetermined campaign. In other words, if input of certain information has been performed in the terminal device 100, the terminal device 100 also transmits the input information to the system server 10 when the terminal device 100 is held over the IC tag 300. The system server 10 instructs the terminal device 100 to activate an application based on the information transmitted from the terminal device 100.

Note that in a case where a coupon only for a limited area, a coupon only for a limited temperature, a coupon only for a limited user demographic, or a coupon only for during a campaign is to be provided to the terminal device 100, the system server 10 may or may not consider information of the tag ID of the IC tag 300 and the user ID of the user who operates the terminal device 100 into account when the system server transmits the application activation instruction to the terminal device 100.

As described above, even when simply a coupon is to be provided to the terminal device 100, the information processing system 1 according to the embodiment of the present disclosure can provide the coupon that is limited under various conditions by taking various circumstances of the time at which the user of the terminal device 100 holds the terminal device 100 over the IC tag 300 into account.

In addition, when any other service is to be provided to the terminal device 100, the information processing system 1 according to the embodiment of the present disclosure can likewise take various circumstances of the time in which the user of the terminal device 100 holds the terminal device 100 over the IC tag 300 into account.

For example, when a stamp-rally service is to be provided by holding the terminal device 100 over the IC tag 300 in the information processing system 1 according to the embodiment of the present disclosure, the system server 10 takes position information that the terminal device 100 acquired using the sensor unit 115 when the terminal device 100 was held over the IC tag 300 into account. Therefore, the system server 10 can determine whether or not the position is a place that the user of the terminal device 100 has visited using the position information transmitted from the terminal device 100.

Alternatively, when a service of a membership card is to be provided when the terminal device 100 is held over the IC tag 300 in the information processing system 1 according to the embodiment of the present disclosure, the system server 10 transmits an application activation instruction to the terminal device 100 so that a proper membership card is displayed on the display unit 112 of the terminal device 100 based on information such as the store and the location relevant to the tag ID of the IC tag 300 and the user ID of the user who operates the terminal device 100.

As such, when a coupon is to be provided to the terminal device 100 in the information processing system 1 according to the embodiment of the present disclosure, for example, a different coupon can be provided to the terminal device 100 according to the situation at the time when the terminal device 100 is held over the IC tag 300. In addition, in the information processing system 1 according to the embodiment of the present disclosure, a proper service can be provided to the terminal device 100 based on the tag ID of the IC tag 300 and the user ID of the user who operates the terminal device 100.

As described above, the system server 10 generates the application activation instruction for the terminal device 100 using the information of the tag ID and the user ID (or the terminal ID) transmitted from the terminal device 100. Here, the user ID used in the information processing system 1 according to the embodiment of the present disclosure may be categorized into a plurality of levels. For example, the user ID may be categorized into four levels as below.

Level 0: ID based on a personal identification number (PIN) or biometric authentication Level 1: ID based on a trusted execution environment (TEE) or the like Level 2: ID based on authentication of an embedded secure element (SE)

Level 3: ID based on authentication of a universal integrated circuit card (UICC)

When the user of the terminal device 100 holds the terminal device 100 over the IC tag 300, the terminal device 100 transmits the tag ID and the user ID to the system server 10. At this time, the terminal device 100 may transmit the category of the user ID to the system server 10. For example, when the user ID is categorized into the four levels described above, the system server 10 may manage the categories of the user ID in a form corresponding to bits.

Further, in the information processing system 1 according to the embodiment of the present disclosure, generation of an application activation instruction and a linkage process to another service may be performed using the information of the categories of the user ID in addition to the tag ID and the user ID. For example, when a service that is close to distribution of a paper coupon is to be provided, the information processing system 1 according to the embodiment of the present disclosure allows the service even when the category of the user ID is Level 0; however, when a ticketing service, a payment service, or the like is to be provided, the information processing system may control such that use of such a service is not allowed when the category of the user ID is Level 0 or 1, but use of the service is allowed at Level 2 or 3. In addition, when a service associated with a cloud service of a mobile network operator (MNO) is to be provided, the information processing system 1 according to the embodiment of the present disclosure may also control such that use of the service is allowed only when the category of the user ID is Level 3.

As described above, the information processing system 1 according to the embodiment of the present disclosure can control a service level according to a category of the user ID transmitted from the terminal device 100 to the system server 10.

In the information processing system 1 according to the embodiment of the present disclosure, by holding the terminal device 100 over the IC tag 300 and thereby transmitting information of the IC tag 300 from the terminal device 100 to the system server 10, an application activation instruction according to the IC tag 300 can be provided from the system server 10 to the terminal device 100. Here, by adding a mechanism that authenticates legitimacy of the IC tag 300 over which the terminal device 100 is held, the information processing system 1 according to the embodiment of the present disclosure can perform secure exchange of information. Note that authentication of legitimacy of the IC tag 300 is authenticating whether or not the IC tag 300 has been issued by a business operator that provides a service that the terminal device 100 intends to use.

Figure 11:
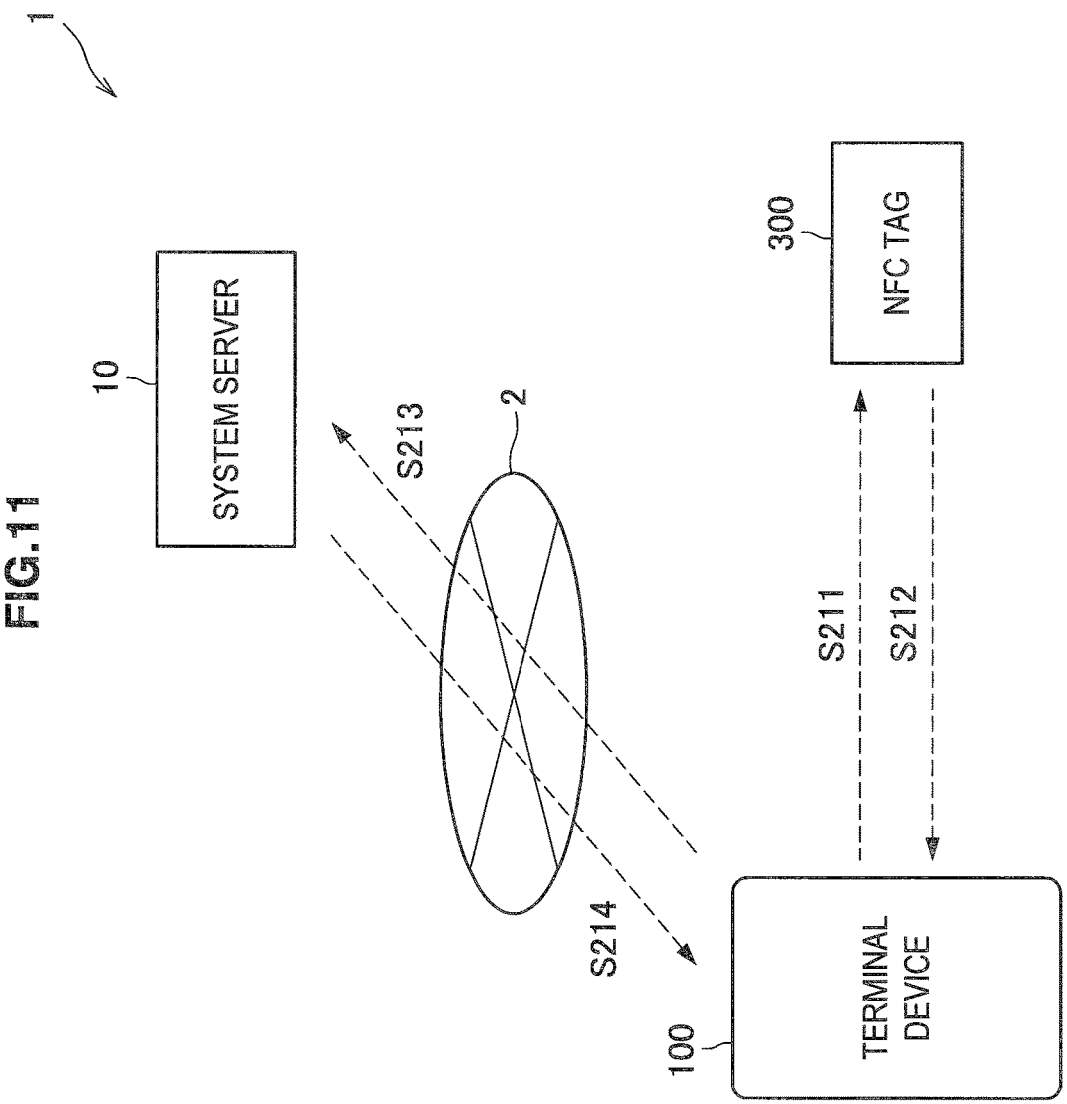
FIG. 11 is an illustrative diagram showing an overview of an operation of the information processing system 1 according to an embodiment of the present disclosure.

FIG. 11 is an illustrative diagram showing an overview of an operation of the information processing system 1 according to the embodiment of the present disclosure. FIG. 11 illustrates the overview of the operation of each device that constitutes the information processing system 1 that performs secure exchange of information by authenticating legitimacy of the IC tag 300. Note that, in FIG. 11, the IC tag 300 is assumed to be a tag that has a one-side authentication mechanism that can append a signature to a telegraphic message.

In the present embodiment, the system server 10 generates a session random number and provides the generated session random number to the terminal device 100 for secure exchange of information. The terminal device 100 retains the session random number acquired from the system server 10 in the control unit 113, and executes near field communication with the IC tag 300 using the session random number. The terminal device 100 transmits a message authentication code (MAC) acquired from the IC tag 300 and the session random number used in the near field communication to the system server 10. The system server 10 performs authentication of the MAC of the IC tag 300 and the session random number transmitted from the terminal device 100. By performing authentication of the MAC of the IC tag 300 and the session random number transmitted from the terminal device 100, the system server 10 can authenticate legitimacy of the IC tag 300.

The above-described operation will be described in detail using FIG. 11. When the terminal device 100 that has acquired the session random number from the system server 10 is held over the IC tag 300, the near field communication is executed between the near field communication unit 113 of the terminal device 100 and the IC tag 300. The terminal device 100 transmits the session random number to the IC tag 300 (Step S211), and the IC tag 300 replies to the terminal device 100 with the session random number transmitted from the terminal device 100 in Step S211 described above and the tag ID and the MAC that the IC tag 300 retains (Step S212).

The terminal device 100 that has received the tag ID and the MAC from the IC tag 300 transmits the tag ID and the MAC acquired from the IC tag 300, the session random number called at the time of near field communication, and information of the terminal device 100 for using the information processing system 1 to the system server 10 using the wireless communication unit 111 (Step S213). With regard to the information of the terminal device 100 for using the information processing system 1, when the near field communication unit 113 possesses the information, for example, it may be the information, and when the near field communication unit 113 does not possess the information, it may be the user ID and a password for using the information processing system 1.

Note that, when the communication of the terminal device 100 at the time of the transmission of Step S213 from the terminal device 100 to the system server 10 is in an off-line state, the transmission may be performed after an on-line communication state is restored.

The system server 10 that has acquired the information from the terminal device 100 authenticates legitimacy of the IC tag 300 using the acquired information. The system server 10 can authenticate whether or not the terminal device 100 that has provided the session random number has been held over the tag using the issued session random number, and can authenticate the IC tag 300 using the tag ID and the MAC acquired from the IC tag 300.

The terminal device 100 can retain an arbitrary number of the session random numbers issued by the system server 10 in the memory 117. Then, the terminal device 100 deletes one of the session random numbers each time it is held over the IC tag 300. When the number of session random numbers retained in the memory 117 reaches a predetermined threshold value or lower, the terminal device 100 may access the system server 10 to replenish the session random numbers. Then, the system server 10 provides the terminal device 100 with session random numbers newly generated according to a request from the terminal device 100 (Step S214).

As each of the devices of the information processing system 1 according to the embodiment of the present disclosure executes the operation described above, legitimacy of the IC tag 300 can be authenticated and thereby information can be securely exchanged without using a reader-writer terminal that has a secure mechanism.

Next, a modified example in which the IC tag 300 is provided with an NFC forum data exchange format (NDEF) area will be shown. The NDEF is a data format used when data is exchanged in NFC. In the NDEF area, one NdefMessage is included, and the NdefMessage includes 0 or more NdefRecords.

The IC tag 300 may store information of a server that the terminal device 100 should access and a parameter that the terminal device 100 transmits to the server in the payload of the NDEF area. Then, when the terminal device 100 reads the data written in the NDEF area of the IC tag 300 in near field communication with the IC tag 300, the terminal device 100 reads the information recorded in the NDEF area of the IC tag 300 and thereby can perform access to the server and activation of an application based on the information.

A case in which exchange of information is performed as shown in, for example, the sequence diagram of FIG. 4 will be considered. When the terminal device 100 is held over the IC tag 300, the terminal device 100 reads the NDEF area of the IC tag 300 in the near field communication with the IC tag 300 in Step S111 of FIG. 4. When reading the NDEF area of the IC tag 300 in the near field communication with the IC tag 300, the terminal device 100 may read the NDEF area using a discovery function of the NFC.

Then, when acquiring the URL of the server and the parameter recorded in the NDEF area of the IC tag 300 from the IC tag 300 in the near field communication, the terminal device 100 accesses the URL acquired through the near field communication and transmits the parameter acquired through the same near field communication in Step S113 of FIG. 4.

The server designated with the URL (for example, the system server 10) instructs an application to activate and gives an instruction about details of execution in the application based on the parameter transmitted from the terminal device 100 in Step S114 of FIG. 4. The terminal device 100 activates the application based on the instruction from the serer designated with the URL (for example, the system server 10).

By accessing the server designated with the URL recorded in the NDEF area of the IC tag 300 and transmitting the parameter recorded in the NDEF area of the IC tag 300 to the server, the terminal device 100 can activate the application based on the instruction from the server.

In the example described above, although the information of the server that the terminal device 100 should access is set to be stored in the NDEF area of the IC tag 300, the present disclosure is not limited to this example. For example, an activation instruction of a specific application of the terminal device 100, and a parameter used during activation of the application may be recorded in the NDEF area of the IC tag 300.

In this case, when the terminal device 100 reads the NDEF area of the IC tag 300 through the near field communication, the terminal device can activate the application based on the activation instruction of the specific application and the parameter used during the activation recorded in the NDEF area. Also in this case, the terminal device 100 may read the NDEF area using the discovery function of the NFC to read the NDEF area of the IC tag 300 through the near field communication.

As the activation instruction of the specific application and the parameter used during the activation are recorded in the NDEF area of the IC tag 300, the terminal device 100 can activate the application for which the activation instruction is written in the NDEF area of the IC tag 300 taking the opportunity of being held over the IC tag 300, without performing communication with the server.

<2>. CONCLUSION

As described above, according to the embodiment of the present disclosure, it is not necessary for an object over which the terminal device 100 is held to be a highly functional device such as a reader-writer terminal, and it is sufficient for the object to be the IC tag 300 in which data such as an ID is written in advance, and accordingly a developing cost of the system can be suppressed. In addition, since a common application executed in the terminal device 100 serves as a reading and writing mechanism with respect to the IC tag 300, it is not necessary to install the reading and writing mechanism with respect to the IC tag 300 in individual applications, and therefore resources can be concentrated on the original functions that the individual applications are supposed to provide.

In addition, according to an embodiment of the present disclosure, the information relating to the IC tag 300 is managed unitarily by the system server 10. Thus, by changing data managed unitarily by the system server 10, addition and change of an application to be activated and change of an application activation method (activation parameter) can be easily performed with respect to the distributed IC tag 300. In addition, according to the embodiment of the present disclosure, re-use of the distributed IC tag 300 can also be performed by changing the data managed unitarily by the system server 10.

In addition, according to an embodiment of the present disclosure, a plurality of cases of activation of applications can be defined with one IC tag 300. For example, applications to be activated and activation methods (activation parameters) can be switched according to a situation (the date and time, position information, or the like) at the time when the terminal device 100 was held over, user operation of the terminal device 100, and past logs accumulated in the system server 10.

In addition, according to an embodiment of the present disclosure, logs are managed unitarily by the system server 10. Accordingly, details of the logs can be set for an application activation condition. For example, in the information processing system 1 according to the embodiment of the present disclosure, a service of distributing coupons or the like can be provided to users who have been frequently holding their devices over a specific IC tag 300.

When there are a plurality of application candidates according to operation in a normal smartphone, a screen for selecting an application is displayed, and an application that a user selects therefrom is activated. On the other hand, according to the embodiment of the present disclosure, a unique application can be targeted to be activated in the terminal device 100 as a result of the terminal device 100 being held over the IC tag 300.

In addition, according to an embodiment of the present disclosure, it is possible to easily change data managed by the IC tag 300. In addition, according to the embodiment of the present disclosure, when the IC tag 300 retains a mechanism that can authenticate legitimacy, it can strictly authenticate which terminal device 100 has been held over the tag at which location without a reader-writer terminal with a secure mechanism.

The respective steps of the processes executed by each of the devices of the present specification are not necessarily performed in the order disclosed in the sequence diagram or the flowchart in a time series manner. The respective steps of the processes executed by each of the devices may be performed in a different order from the order disclosed in the flowchart, or performed in parallel.

In addition, a computer program for causing hardware such as a CPU, a ROM, and a RAM included in each device to exhibit functions equivalent to the configuration of each device described above can also be created. In addition, a storage medium in which the computer program is stored can also be provided. Further, by configuring the respective functional blocks shown in the functional block diagrams as hardware, a series of process can be realized by the hardware.

The preferred embodiment of the present disclosure has been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

an activation control unit configured to transmit first information that includes information read through near field communication to a server device, to acquire second information transmitted from the server device according to the first information, and to control activation of an application of the information processing device itself based on the acquired second information.

(2)

The information processing device according to (1), wherein the activation control unit retains authentication information used in reading of information through the near field communication.

(3)

The information processing device according to (2), wherein, at the time of reading the information through the near field communication, the activation control unit deletes the used authentication information.

(4)

The information processing device according to (2) or (3), wherein the activation control unit acquires the authentication information from the server device.

(5)

The information processing device according to any one of (1) to (4), wherein the activation control unit causes information based on operation of a user with respect to the information processing device itself to be included in the first information and then transmits the information to the server device.

(6)

The information processing device according to any one of (1) to (5), wherein the activation control unit causes information regarding attributes of the application to be activated in the information processing device itself to be included in the first information as the information based on the operation of the user, and transmits the information to the server device.

(7)

The information processing device according to any one of (1) to (6), wherein the activation control unit causes information of a current date and time to be included in the first information and transmits the information to the server device.

(8)

The information processing device according to any one of (1) to (7), wherein the activation control unit causes position information of the information processing device itself to be included in the first information and transmits the information to the server device.

(9)

The information processing device according to any one of (1) to (8), wherein the activation control unit transmits the first information in which the read information includes position information of the information processing device itself to the server device.

(10)

The information processing device according to any one of (1) to (9), further including:

a near field communication unit configured to execute the near field communication.

(11)

A server device including:

an application managing unit configured to preliminarily retain information of an application to be activated in an information processing device; and an application activation instructing unit configured to acquire the information of the application to be activated in the information processing device from the application managing unit according to information that includes information read by the information processing device through near field communication and that has been transmitted from the information processing device and to reply to the information processing device.

(12)

The server device according to (11), wherein the application activation instructing unit acquires the information of the application from the application managing unit and replies to the information processing device according to a situation at the time at which the information is transmitted from the information processing device.

(13)

The server device according to (11) or (12), wherein the application managing unit enables change of the information of the application based on transmission of information from the information processing device having specific authority.

(14)

An information processing system including:

an information processing device; and a server device, wherein the information processing device includes:

an activation control unit configured to transmit first information that includes information read through near field communication to the server device, to acquire second information transmitted from the server device according to the first information, and to control activation of an application based on the acquired second information, and wherein the server device includes:

an application managing unit configured to preliminarily retain information of an application to be activated in the information processing device; and an application activation instructing unit configured to acquire the information of the application to be activated in the information processing device from the application managing unit according to the first information transmitted from the information processing device and to reply to the information processing device.

REFERENCE SIGNS LIST 1 information processing system
10 system server
11 user managing unit
12 tag managing unit
13 log managing unit
14 service managing unit
15 application managing unit
16 authentication information retaining unit
17 system I/F
20 web server
100, 200 terminal device
300 IC tag

The invention claimed is:

1. An information processing device, comprising:
a position sensor configured to detect current position of the information processing device;
a memory configured to store a first plurality of session random numbers as authentication information; and
first circuitry configured to:
read first information via near field communication;
transmit a request for a second plurality of session random numbers to a server device based on the read first information and a value of the first plurality of session random numbers that is less than a threshold value;
transmit current position information associated with the current position detected by the position sensor and the first information read via the near field communication to the server device;
receive the second plurality of session random numbers and application activation information based on the transmitted current position information, the transmitted request, and the transmitted first information, wherein the application activation information includes an application identifier (ID); and
activate an application in the information processing device based on the received application activation information.

2. The information processing device according to claim 1, wherein the first circuitry is further configured to delete one session random number from the first plurality of session random numbers after the first information is read.

3. The information processing device according to claim 1, wherein the first circuitry is further configured to receive the first plurality of session random numbers as authentication information from the server device.

4. The information processing device according to claim 1, wherein the first circuitry is further configured to:
add second information to the first information based on a user operation with respect to the information processing device; and
transmit the second information and the first information to the server device.

5. The information processing device according to claim 1, wherein the first circuitry is further configured to:
add second information to the first information, wherein the second information is related to a plurality of attributes of the application activated in the information processing-device; and
transmit the second information and the first information to the server device.

6. The information processing device according to claim 1, wherein the first circuitry is further configured to:
add second information to the first information, wherein the second information is associated with a current time and date at which the first information is read; and
transmit the second information and the first information to the server device.

7. The information processing device according to claim 1, wherein the first circuitry is further configured to add the current position information of the information processing device to the first information.

8. The information processing device according to claim 1, wherein the first information includes position information of the information processing device.

9. The information processing device according to claim 1, further comprising second circuitry configured to start the near field communication.

10. The information processing device according to claim 1, wherein the first information further includes device identification information associated with the information processing device.

11. The information processing device according to claim 1, wherein
the near field communication activates a basic application in the information processing device, and
the basic application activates a browser application based on the application activation information.

12. A server device, comprising:
circuitry configured to:
receive first information and current position information from an information processing device,
wherein the information processing device reads the first information via near field communication, and
wherein a position sensor of the information processing device detects the current position information of the information processing device;
receive a request for a second plurality of session random numbers from the information processing device based on the read first information and a value of a first plurality of session random numbers in the information processing device that is less than a threshold value,
wherein each of the first plurality of session random numbers and the second plurality of session random numbers corresponds to authentication information; and
transmit the second plurality of session random numbers and application activation information to the information processing device based on the received first information, the received request, and the received current position information,
wherein the application activation information comprises an application identifier (ID), and
wherein the information processing device controls an activation of an application based on the application activation information.

13. The server device according to claim 12, wherein the circuitry is further configured to transmit second information to the information processing device based on a time at which the information processing device transmits the first information and the current position information to the server device.

14. The server device according to claim 12, wherein the circuitry is further configured to change the first information based on the information processing device that has a specific authority over registration.

15. The server device according to claim 12, wherein the circuitry is further configured to designate a browser application based on the application activation information, and wherein the browser application receives application information from a web server.

16. An information processing system, comprising:
an information processing device; and
a server device,
wherein the information processing device includes:
a position sensor configured to detect current position of the information processing device;
a memory configured to store a first plurality of session random numbers as authentication information; and
first circuitry configured to:
read first information via near field communication;
transmit a request for a second plurality of session random numbers to the server device based on the read first information and a value of the first plurality of session random numbers that is less than a threshold value;
transmit current position information associated with the current position detected by the position sensor and the first information read via the near field communication to the server device;
receive the second plurality of session random numbers and application activation information based on the transmitted current position information, the transmitted request, and the transmitted first information, wherein the application activation information includes an application identifier (ID); and
activate an application in the information processing device based on the application activation information, and
wherein the server device includes:
second circuitry configured to:
receive the request for the second plurality of session random numbers, the current position information, and the first information from the information processing device; and
transmit the second plurality of session random numbers and the application activation information to the information processing device based on the received current position information, the received request, and the received first information.

17. An information processing method, comprising:
in an information processing device:
detecting, by a position sensor, current position of the information processing device;
storing, in a memory, a first plurality of session random numbers as authentication information,
reading first information via near field communication;
transmitting a request for a second plurality of session random numbers to a server device based on the read first information and a value of the first plurality of session random numbers that is less than a threshold value;
transmitting current position information associated with the current position detected by the position sensor and the first information read via the near field communication to the server device;
receiving the second plurality of session random numbers and application activation information based on the transmitted current position information, the transmitted request, and the transmitted first information, wherein the application activation information includes an application identifier (ID); and
activating an application in the information processing device based on the application activation information.

18. The information processing method according to claim 17, wherein
the near field communication activates a basic application in the information processing device, and
the basic application activates a browser application based on the received application activation information.

19. A non-transitory computer-readable medium having stored thereon computer-readable instructions that, when executed by a processor in an information processing device, cause the processor to execute operations, the operations comprising:
detecting, by a position sensor, current position of the information processing device;
storing, in a memory, a first plurality of session random numbers as authentication information;
reading first information via near field communication;
transmitting a request for a second plurality of session random numbers to a server device based on the read first information and a value of the first plurality of session random numbers that is less than a threshold value;
transmitting current position information associated with the current position detected by the position sensor and the first information read via the near field communication to the server device;
receiving the second plurality of session random numbers and application activation information based on the transmitted current position information, the transmitted request, and the transmitted first information, wherein the application activation information includes an application identifier (ID); and
activating an application in the information processing device based on the application activation information.

* * * * *